US009738003B2

(12) United States Patent
Flood

(10) Patent No.: US 9,738,003 B2
(45) Date of Patent: Aug. 22, 2017

(54) CARTRIDGE AND TUBULAR CONTAINER TRIMMING AND REFINISHING APPARATUS FOR INK AND LABEL REMOVAL

(71) Applicant: Paul J. Flood, Elizabethtown, KY (US)

(72) Inventor: Paul J. Flood, Elizabethtown, KY (US)

( * ) Notice: Subject to any disclaimer, the term of this patent is extended or adjusted under 35 U.S.C. 154(b) by 0 days.

(21) Appl. No.: 14/998,891

(22) Filed: Feb. 29, 2016

(65) Prior Publication Data

US 2016/0311213 A1    Oct. 27, 2016

Related U.S. Application Data

(63) Continuation-in-part of application No. 13/986,323, filed on Apr. 19, 2013, now Pat. No. 9,272,502.

(51) Int. Cl.
| | |
|---|---|
| *B32B 38/10* | (2006.01) |
| *B32B 43/00* | (2006.01) |
| *B29C 63/00* | (2006.01) |
| *B26D 1/36* | (2006.01) |
| *B26D 3/28* | (2006.01) |
| *B62D 7/18* | (2006.01) |

(Continued)

(52) U.S. Cl.
CPC ............. *B26D 7/22* (2013.01); *B08B 9/083* (2013.01); *B26D 1/36* (2013.01); *B26D 3/282* (2013.01); *B26D 7/1863* (2013.01); *B26D 7/2614* (2013.01); *B29C 63/0013* (2013.01); *B32B 43/006* (2013.01); *B08B 1/02* (2013.01); *Y10S 156/921* (2013.01); *Y10S 156/936* (2013.01); *Y10T 156/1184* (2015.01); *Y10T 156/1961* (2015.01); *Y10T 156/1967* (2015.01)

(58) Field of Classification Search
CPC ....... B08B 1/02; B29C 63/0013; B26D 3/282; B26D 7/1863; B32B 43/006; Y10T 156/1184; Y10T 156/1961; Y10T 156/1967; Y10S 156/921; Y10S 156/936
See application file for complete search history.

(56) References Cited

U.S. PATENT DOCUMENTS 3,292,257 A * 12/1966 Popeil ................... A23N 15/04
30/121.5
4,013,497 A    3/1977 Wolf
(Continued)

FOREIGN PATENT DOCUMENTS

WO    WO 2010002111 A2 *  1/2010

*Primary Examiner* — Mark A Osele
(74) *Attorney, Agent, or Firm* — Carrithers Law Office, PLLC

(57) ABSTRACT

A device for removing a thin outer layer from the surface of a cartridge or tubular container such as a caulk cartridge for removal of ink, contaminant, adhesive, or printed or stamped label from the outside of the cartridge. The apparatus includes cartridge hopper and a cartridge handling mandrel or plunger which automatically removes a cartridge from the hopper aligning same for insertion of the cartridge axially through the throat of a spinning ring which contains at least one and preferably a plurality of inwardly extending knifes. The spinning knife distal end trims or peels off the label, adhesive, ink, imperfections, or even a thin film from an outer layer of a selected thickness effectively reconditioning the cartridge for reuse to be filled with virgin material or to be used as uncontaminated re-ground material to be sold as scrap.

20 Claims, 14 Drawing Sheets

(51) Int. Cl.
  *B08B 1/02*   (2006.01)
  *B26D 7/22*   (2006.01)
  *B26D 7/18*   (2006.01)
  *B08B 9/08*   (2006.01)
  *B26D 7/26*   (2006.01)

(56) References Cited

U.S. PATENT DOCUMENTS

| | | |
|---|---|---|
| 4,122,734 A | 10/1978 | Hurst |
| 4,220,481 A | 9/1980 | Bleiman et al. |
| 4,325,775 A | 4/1982 | Moeller |
| 4,575,938 A * | 3/1986 | McCullough ......... B26B 25/002 30/276 |
| 4,944,832 A | 7/1990 | Abe et al. |
| 5,152,865 A | 10/1992 | Hurst |
| 5,600,862 A | 2/1997 | Bleske et al. |
| 6,199,615 B1 * | 3/2001 | Klarl ....................... B08B 9/083 156/706 |
| 6,434,776 B1 * | 8/2002 | Pfeiffer ................... B23B 5/168 15/104.04 |
| 6,698,321 B2 * | 3/2004 | Oswald .................. B23B 5/168 82/113 |
| 6,855,045 B2 * | 2/2005 | Laws ..................... B24B 9/007 451/462 |
| 7,294,222 B2 * | 11/2007 | Temple .................. B08B 1/008 15/104.03 |
| 7,337,698 B2 * | 3/2008 | DiBiase .................... B23B 5/12 82/113 |
| 8,479,797 B1 * | 7/2013 | Hurst ...................... B08B 9/083 156/717 |
| 2010/0276083 A1 * | 11/2010 | Hurst ...................... B08B 9/083 156/717 |
| 2012/0011980 A1 * | 1/2012 | Kroger ................... A22B 5/165 83/698.41 |
| 2017/0021514 A1 * | 1/2017 | Hall ....................... B26B 25/002 |

* cited by examiner

CARTRIDGE AND TUBULAR CONTAINER TRIMMING AND REFINISHING APPARATUS FOR INK AND LABEL REMOVAL

CROSS REFERENCE TO RELATED APPLICATIONS

This is a Continuation-in-Part application claiming from U.S. Pat. No. 9,272,502 issued on Mar. 1, 2016 which is incorporated herein.

TECHNICAL FIELD

The present invention relates to the field of devices used to remove contaminating material from an outer surface of a cylindrical cartridge, container or tubular member such as a manufacturer's adhesive or inked label to enabling a user to reuse the tubular member for insertion of virgin material an re-application of a new label or to provide means for removing contaminants from the exterior surface of the tubular member providing a clean cartridge for reuse, regrind, or recycling.

BACKGROUND OF THE INVENTION

Caulk and adhesive manufacturers and packaging companies such as General Electric, Corporation, Suncoco, Inc., or Dow Corning Corporation of Midland, Mich. often package caulk, adhesive or sealants for use in a cylindrical cartridge which are selected standard sizes and can be used in a mechanical or pressurized caulk guns. A standard size cartridge for consumer use holds one tenth of a gallon and measures about eight and one half inches long with a diameter of a little under two inches. During manufacture, an identification label is applied to the outside of cartridges typically using a silk screen or off-set printing process. In the silk screening process, a fine mesh screen covered by a stencil is held against the outside surface of the cartridge. The stencil is a sheet of material which is impenetrable with respect to the ink used. An image of the design to be printed onto the cartridge is removed from a sheet of material to create the stencil. As the screen and stencil come into contact with the cartridge, ink is applied by a roller, brush, squeegee or the like to the surface of the stencil and the exposed screen. The stencil allows only the ink passing through the open areas to contact and adhere to the cartridge.

Companies produce many thousands of cartridges per day so that even a small percentage of rejects due to label application problems, incorrect label information, or mislabeling amount to thousands of cartridges which must be either recycled, destroyed or reworked. Moreover, residual ink or paper left on the cartridge must be separated from scarp even in regrind to avoid contamination of new cartridges. It can be seen that the resulting loss translates into thousands of dollars of expense per day. Additionally, there is a limit to the amount of waste cartridges that can be recycled into new cartridges as regrind due to the different heat characteristics and chemical and physical properties of the regrind as compared with virgin feed material. Therefore, the unused and un-recyclable cartridges add to landfill volumes which costs manufacturers and society in a variety of ways.

DESCRIPTION OF THE RELATED ART

The applicant is unaware of any patents or devices in existence which include all of the elements and limitations included in the present invention.

SUMMARY OF THE INVENTION

A device for removing a thin outer layer of a cartridge or tubular container such as a caulk cartridge to remove a manufacturers's ink or adhesive and label, whether the label is a separate piece of printed paper with adhesive or a label which has been printed directly onto the outside of the cartridge by silk screening or offset printing. The device includes cartridge hopper and a cartridge handling mandrel or plunger which automatically removes a cartridge from the hopper aligning same for insertion of the cartridge axially through the throat of a spinning ring which contains an inwardly extending knife edge. The spinning knife edge trims or peels off the label, adhesive, ink, imperfections, or even a thin film from an outer layer of a selected thickness effectively reconditioning the cartridge for reuse to be filled with virgin material or to be used as uncontaminated re-ground material to be sold as scrap or blended into the feed for extrusion of new cartridges. the cartridge is ejected from the mandrel of the machine for packaging and the contaminated scrap is removed via a vacuum system.

The cartridge and tubular container shaving apparatus, comprises or consists of a base plate and a label removing unit attaching to the base plate. The label removing unit comprises a frame including a bushing having a cylinder rotatably held therein, the cylinder is open at both ends. The cylinder including a knife holding ring spaced apart from in cooperative engagement therewith. The cylinder and the knife holding ring are configured to allow the cartridge to pass axially therethrough. The knife holding ring has at least one opening allowing at least one knife to be adjustably held therein in a selected position having a label shaving edge extending inward toward an axial center of the knife holding ring and includes means for rotating the knife holding ring extending coaxially around the cylinder. The frame includes at least one cartridge hopper in cooperative engagement with the cylinder and a cartridge infeed chute feeding a cartridge to the at least one hopper. A cartridge handling unit mounts to the base plate. The cartridge handling unit comprises at least one linear actuator capable of carrying a carriage plate forward towards the label removal unit or rearwards away from the label removal unit. The carriage plate including means for removably holding at least one cartridge grasping mandrel extending forward therefrom. The mandrel sliding axially engages an inner surface of a cartridge. The carriage plate includes means for ejecting at least one cartridge therefrom mounted in a coaxial relationship with the mandrel. The cartridge is movably held by the mandrel through the knife holding ring.

More particularly, in accordance with the present invention, there is provided a cartridge and tubular container refinishing apparatus for ink and label removal comprising, consisting essentially of, or consisting of a device for removal of a silk screen or offset printed label or a paper or film label from the outside of the cartridge comprising, consisting of, or consisting essentially of a base plate with a label removing unit and a cartridge handling unit. The label removing unit includes a frame comprising two vertical end walls with a bushing type bearing rigidly attached horizontally therebetween. The bushing has a cylinder rotatably held therewithin. The cylinder is open at both ends and is caused to spin by a motor driven belt driving engaged at a rear end thereof. The cylinder has a knife-holding ring rigidly connected to the rear end face thereof. The cylinder and ring combination is configured to allow the cartridge to pass axially therethrough. The ring has at least one slot allowing at least one knife to be adjustably held therein. The ring has at least one threaded aperture formed therein and at least one screw threaded into the at least one threaded aperture for engaging and rigidly securing the knife blade. The knife has a label shaving edge extending inward toward an axial center of the knife-holding ring. The frame has a first cartridge hopper on one side adjacent to the horizontal cylinder and a second cartridge hopper on an opposite side. The cartridge hoppers are configured so that a first axis of a cartridge at the bottom of the first hopper is parallel to a second axis of a cartridge at the bottom of the second hopper and a third axis of the horizontal cylinder is level with, parallel to and centered between the first axis and the second axis. The label removing unit includes a cartridge infeed chute rollingly feeding cartridges to the first hopper and the second hopper. The frame includes a shavings suction chute comprising a housing extending forward from a rear face of the frame. The housing has an aperture which is coaxial with and slightly larger than the open end of the knife ring. The housing extends downward to a passage leading to a suction system and then to a shavings collection system. A cartridge handling unit is also rigidly attached to the base plate. The cartridge handling unit includes two longitudinal linear actuators which are rigidly fixed to the base plate. The two longitudinal linear actuators are capable of carrying a longitudinal carriage plate forward towards the label removing unit or rearwards away from the label removing unit. The longitudinal carriage plate has a lateral linear actuator rigidly fixed to a top surface thereof. The lateral linear actuator is capable of carrying a lateral carriage plate to an extreme left or an extreme right position. The lateral carriage plate has a mandrel support block rigidly mounted on the top surface. The block rigidly and removably holds two cartridge grasping mandrels. The mandrels are cylindrical, open ended at each end, and capable of sliding axially inside and forming a friction fit with the cartridges. The first mandrel has a fourth axis. The second mandrel has a fifth axis. The fourth and the fifth axes are parallel and level with one another and are spaced apart by the same distance as are the above mentioned first axis and the third axis. The free open ends of the first and the second mandrels are spaced at the same distance from the center of the mandrel support block. The lateral carriage plate also has two cartridge eject cylinders mounted thereon at a position rearward of the mandrel holding block. The first eject cylinder is coaxial with the first mandrel and the second eject cylinder is coaxial with the second mandrel. The pistons of the eject cylinders each have a cartridge pushing plunger attached at the free end thereof. The first of the pistons extends through the first mandrel and the second of the pistons extends through the second mandrel. The free ends of the plungers are flush with the free open ends of the mandrels. The cartridge handling unit is positioned on the base plate so that when the lateral carriage plate is in an extreme left position, the axis of the first mandrel is coaxial with the axis of the cartridge at the bottom of the first hopper and the axis of the second mandrel is coaxial with the axis of the horizontal cylinder. The cartridge handling unit is positioned on the base plate so that when the lateral carriage plate is in an extreme right position, the axis of the first mandrel is coaxial with the axis of the horizontal cylinder and the axis of the second mandrel is coaxial with the axis of the cartridge at the bottom of the second hopper. The cartridge handling unit is positioned so that when the longitudinal carriage plate is in an extreme rearward position, the free open ends of the mandrels are located rearward enough from a rear face of the knife ring so that a cartridge being held on a mandrel moves freely past the knife ring as the lateral carriage plate moves left to right.

Also included in the cartridge label remover is a belt motor starter controlling the motor driving the belt which spins the horizontal cylinder and pneumatic solenoids and servo controls controlling the longitudinal linear actuator, the lateral linear actuator, the first eject cylinder and the second eject actuation. Sensors for the fully forward and fully rearward positions of the longitudinal linear actuator and for extreme left and right positions of the lateral linear actuator are also included. An operator's panel includes a start switch and a stop switch. A programmable controller controls the four pneumatic solenoids or servo controller and the belt motor starter. The programmable controller receives input signals from the fully forward and fully rearward sensors, the extreme left and extreme right position sensors, the start switch and the stop switch. The programmable controller contains a program with adjustable time delays and re-programmable logic for reacting to sensor signals and switches and energizing and de-energizing outputs controlling the solenoids and the motor starter.

It is also contemplated that the mandrel can be inserted into a tube and the mandrel rotated or spun wherein the mandrel and tube can be inserted into a ring or annulus containing at least one knife, tooth or other projecting member in cooperative relationship with the external surface of the tube thereby shaving the ink or label from the tube.

It is also contemplated that the mandrel can comprise a telescoping portion of different sizes for cooperative engagement with annular cutting ring knives of corresponding diameters permitting processing of multi-diameter tubular members.

It is also contemplated that a computer controlled knife extended toward and away from the external surface of the tubular member mounted onto a mandrel in order that a tubular member of different size diameter portions or non-tubular members having tubular portions can be processed using a sharp projecting member such as a tooth or knife to shave the a selected surface thereof.

It is contemplated that an expanding mandrel can be utilized with the present invention.

It is an object of this invention to provide a caulk cartridge label remover which includes a cartridge hopper, a cartridge handling unit, a label removing knife, and a shavings collection system.

It is an object of this invention to provide a caulk cartridge label remover which can remove paper labels and adhesives, printer's ink, or other imperfections from the outer surface of a the tubular container providing a smooth surface for re-application of new labels while maintaining the structural integrity of the original tubular member.

It is another object of the present invention to utilize a sharp blade, tooth, or other projection extending axially inwardly from a ring a selected distance to shave a selected thickness of material from the external surface of the tube.

It is an object of this invention to provide a caulk cartridge label remover which removes a silk screen printed label or a film or paper label from a cartridge. When removing a film or paper label, the label adhesive and small amount of the cartridge cylinder are also removed to leave a clean surface to which a new label may be reapplied.

It is another object of the present invention to provide an apparatus sized to remove ink, adhesive, paint, coatings, contamination, bumps, scratches, or other imperfections from the exterior surface of any cylindrical shaped product including bottles, cans, paste tubes, fiberglass, paper, or corrugated tubing or any size depending upon selection of the appropriate sized mandrel and knife assembly.

It is another object of the present invention to utilize a mandrel or plunger having a slight taper on the free distal end for facilitating insertion of the mandrel into the tubular member to hold the tubular member immobile during the shaving processes limiting movement to the axial direction only.

It is another object of the present invention to provide a means for shaving removal of up to 1 millimeter of material from the exterior surface of the tubular member It is another object of the present invention to provide a means for shaving removal from 0.001 to 1 millimeter of material from the exterior surface of the tubular member.

It is another object of the present invention to provide a means for shaving removal from 0.01 to 1 millimeter of material from the exterior surface of the tubular member.

It is another object of the present invention to provide a means for shaving removal from 0.1 to 1 millimeter of material from the exterior surface of the tubular member.

It is another object of the present invention to provide a means for shaving removal of up to 10 millimeter of material from the exterior surface of the tubular member.

It is another object of the present invention to provide an apparatus to remove contaminants from the external surface of a tubular container composed of plastic, cardboard, paper, aluminum, fiberglass, wood, carbon fiber, copper, or combinations thereof.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
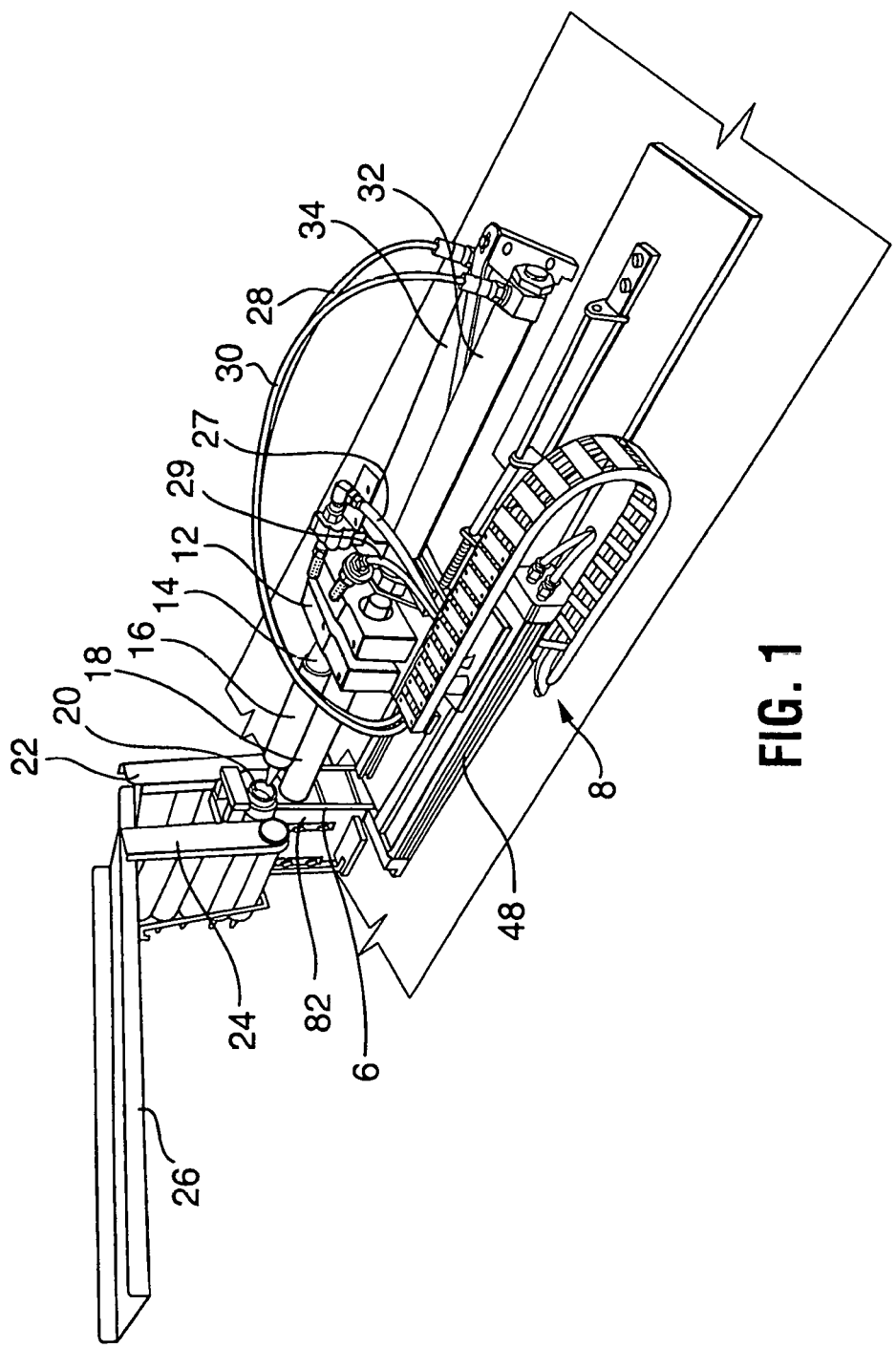
FIG. 1 is a left rear perspective view of the cartridge label remover.

In accordance with the present invention, there is provided a caulk cartridge label remover 10 which peels a thin layer of the outer surface of the cartridge away to remove the label. Whether the label is printed on by silk screening or is a film or paper label which has been applied to the outside of the cartridge with adhesive, the label material and a thin layer of the cartridge is removed from the cartridge by a knife 19 which is held within a spinning ring 21 as the cartridge 16 is moved axially through the throat 20 of the ring 21.

A typical caulk cartridge 16 comprises a hollow cylinder which is open on one end and includes a tapered applicator tip on the other end. The cylinder has a length of about 8.5 inches, an outer diameter of about 1.937 to 1.969 inches and an inner diameter of about 1.875 to 1.953 inches. The actual diameters vary with the particular brand of ingredient to be manufactured.

Figure 2:
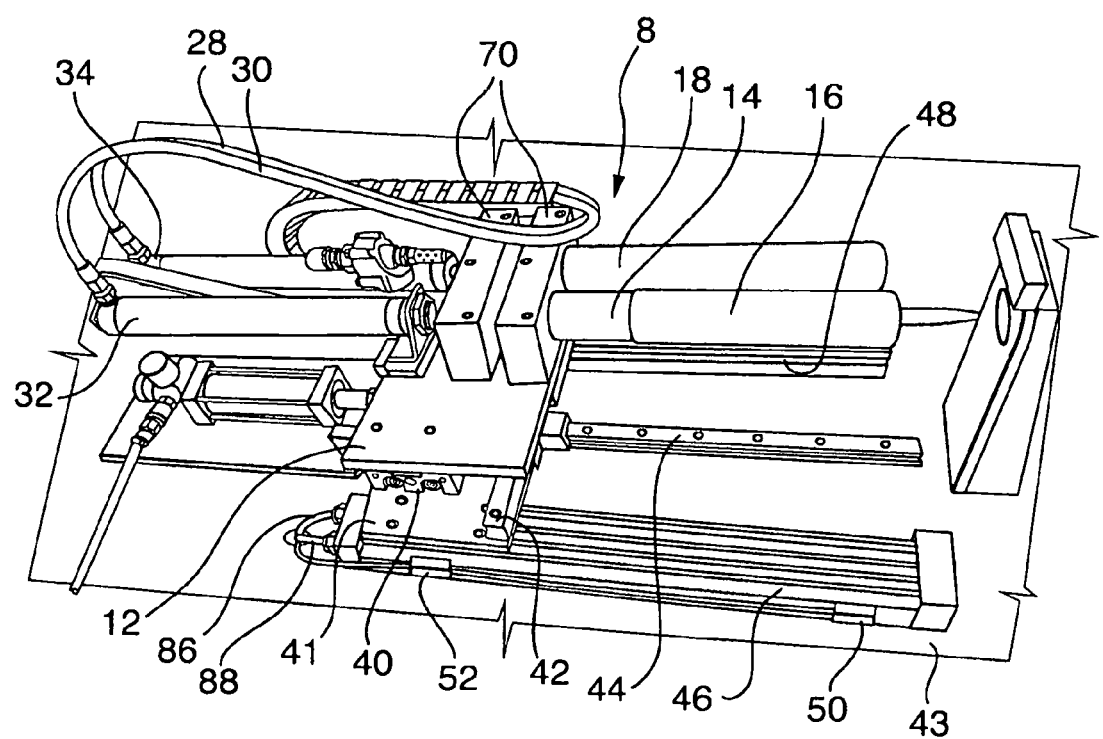
FIG. 2 is a right perspective view of the cartridge label remover.

As best shown in FIG. 2, the cartridge handling unit 8 contains a lateral carriage plate 12, wherein the word 'lateral' refers to the direction of movement of the plate, with two cartridge holding mandrels 14 and 18, two cartridge eject cylinders 32 and 34, one linear actuator 40 to cause lateral movement of lateral carriage plate 12, a longitudinal carriage plate 41, wherein the word 'longitudinal' refers to the direction of movement of that plate, two linear actuators 46 and 48 which carry the longitudinal carriage plate 41 forward and back, and a base plate 43 onto which are mounted the two linear actuators 46 and 48. Linear actuators 46 and 48 are preferably rodless pneumatic cylinders.

Carriage plate 12 includes a block 70 rigidly mounted on a top surface thereof. Two mandrels 14 and 18 which are hollow horizontal parallel cartridge holding cylinders are slightly tapered with the smaller diameter at the free open end. The mandrels are rigidly and removably attached to and extend forward from the front side of block 70. The free ends of mandrels 14 and 18 are open and have an outer diameter of about 0.060 inch less than the diameter of a selected cartridge 16 to be processed. The outer diameters of the mandrels 14 and 18 increase slightly along their length so that when a cartridge is pushed onto them, a friction fit is obtained between the cartridge 16 and the mandrels 14 or 18. Two pneumatic cylinders 32 and 34 are coaxial with mandrels 14 and 18 respectively and have pistons with plungers 33 and 35 mounted onto and extending from the ends of the pistons. The plungers 33 and 35 extend forwardly into both mandrels 14 and 18 and are flush with the front openings of mandrels 14 and 18 when cylinders 32 and 34 are retracted. Both pneumatic cylinders 32 and 34 are mounted on plate 12 to the rear of block 70. When a cartridge 16 is pushed fully onto one of mandrels 14 or 18 and the corresponding pneumatic cylinder 32 or 34 is actuated, the corresponding plunger 33 or 35 pushes or ejects cartridge 16 fully off of mandrel 14 or 18.

Lateral carriage plate 12 is rigidly attached to the linear actuator 40, which is preferably a rodless pneumatic cylinder. Linear actuator 40 carries carriage plate 12 laterally from a left extreme position to a right extreme position and back again to obtain, process and eject cartridges. A rail 42 and a rail follower 142 serve as a guide for carriage plate 12 to ensure wobble free linear motion of carriage plate 12, along with the attached block 70, cartridge holding mandrels 14 and 18, pneumatic cylinders 32 and 34 and plungers 33 and 35. Rail 42 is rigidly attached to longitudinal carriage plate 41 parallel to the lateral or left to right direction of movement and rail follower 142 is rigidly attached to lateral carriage plate 12. At each end of linear actuator 40 are end of stroke sensors 72 at the left extreme position and 73 at the right extreme position. (Sensor 73 is not shown.) These sensors provide positional feedback and cause the next step in the label removal process to occur, as will be more clearly explained later.

Linear actuator 40 is rigidly connected to and carried by carriage plate 41. Carriage plate 41 is, in turn, mounted on and carried longitudinally (that is in a forward and backward direction) by linear actuators 46 and 48. Linear actuators 46 and 48 are rigidly attached to the top surface of base plate 43. End of stroke sensors 50 and 52 give positional feedback for linear actuators 46 and 48. To ensure wobble free forward and backward movement, a rail 44 is rigidly connected to base plate 43 parallel to the direction of forward and backward movement, referred to herein as longitudinal, and a rail follower 144 is connected to the bottom surface of longitudinal carriage plate 41.

End of stroke sensors 50, 52, 72 and 73 are preferably magnetic switches which sense the position of the internal piston within the linear actuators. Alternate embodiments of the present invention include end of stroke sensors which are electronic proximity probes or simple limit switches.

It can be seen that the cartridge holding mandrels 14 and 18 are caused to move laterally by linear actuator 40 and longitudinally by linear actuators 46 and 48 in a horizontal two dimensional space.

Also attached to base plate 43 is the label removing unit 6 which includes a frame 77 comprising two vertical end walls 78 and 80 and a bushing type bearing 76 rigidly attached therebetween, as seen in FIGS. 1, 3, 4, 10 and 11.

Figure 3:
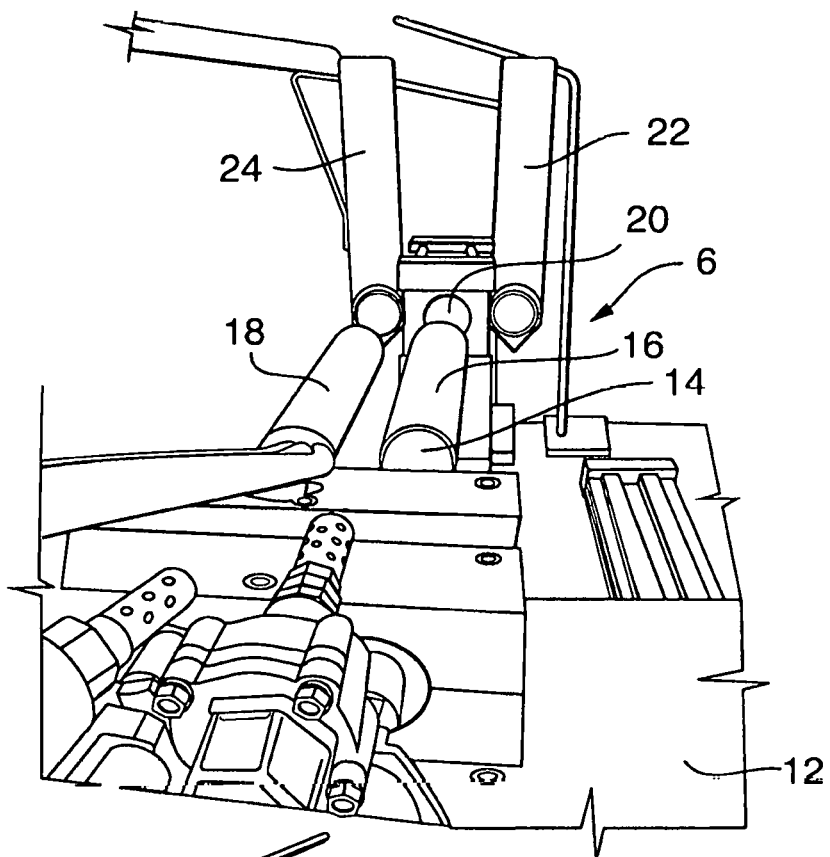
FIG. 3 is a view from the rear end looking into the throat 20 of the label removal unit.
Figure 4:
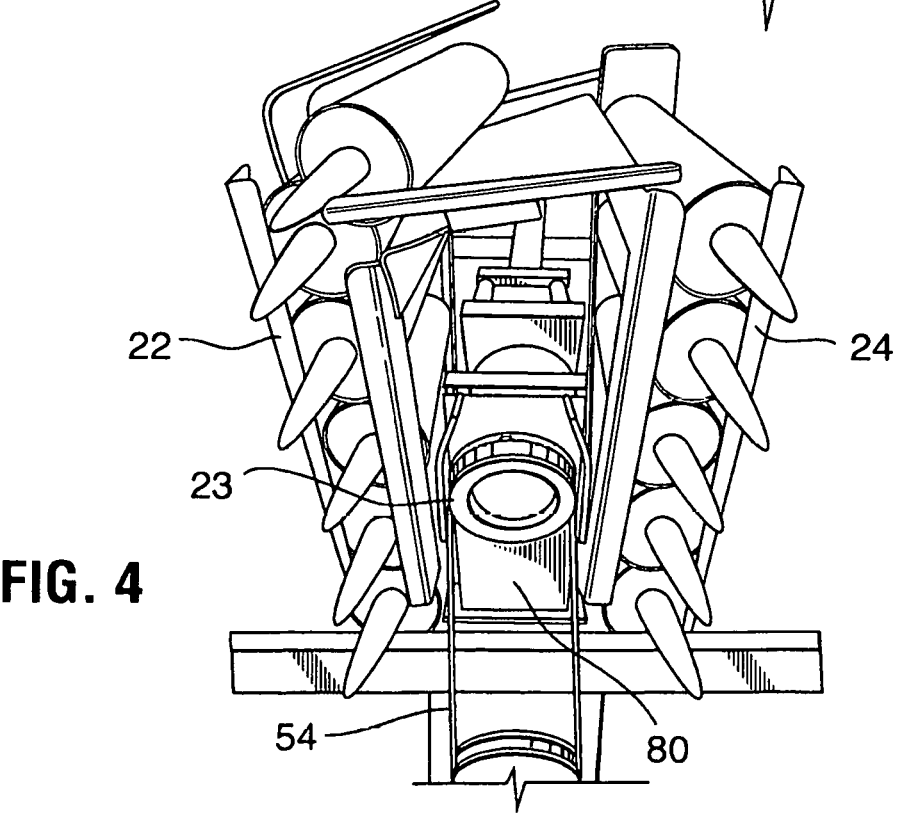
FIG. 4 is a front view of the label removal unit showing the drive cylinder 23 and the cartridge hoppers 22 and 24.
Figure 5:
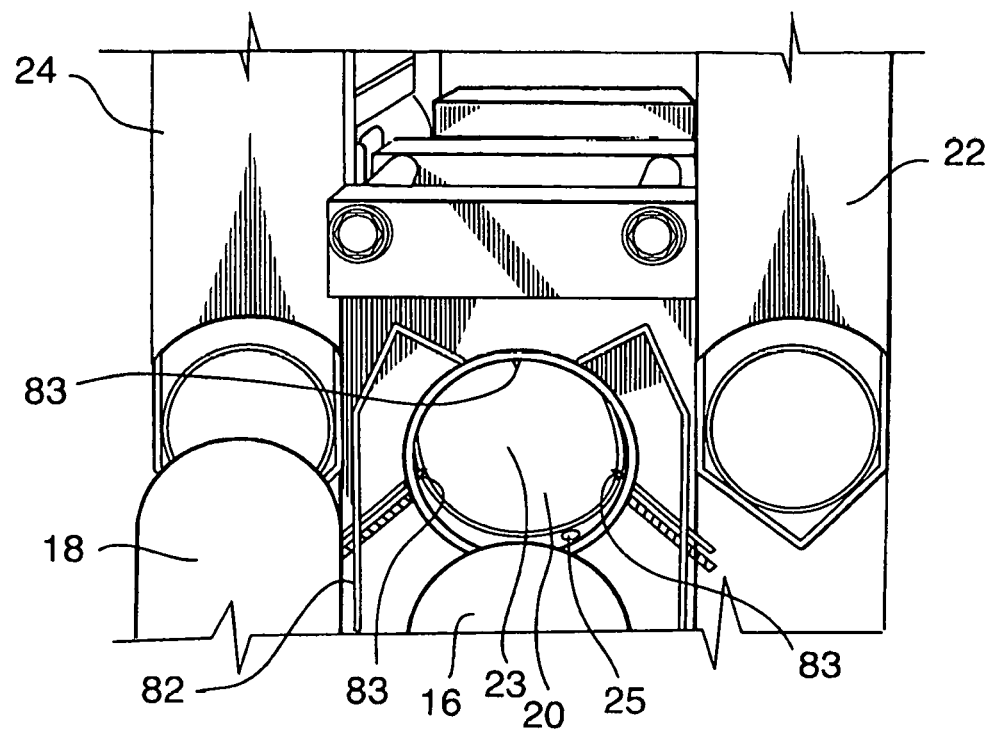
FIG. 5 is a rear, close in view of the throat 20 and hoppers 24 and 22.
Figure 6:
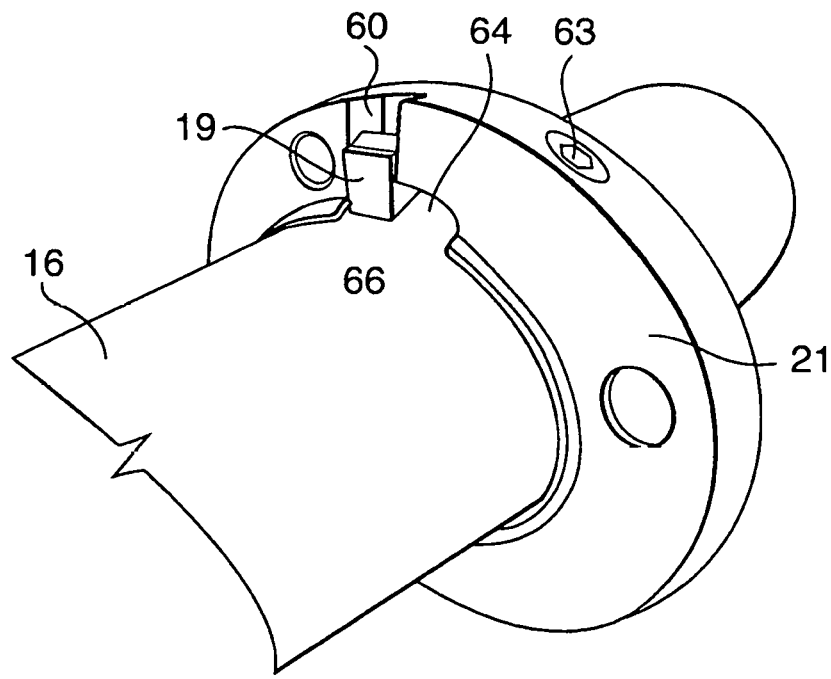
FIG. 6 is a rear perspective view of the knife ring 21 and knife 19.
Figure 7:
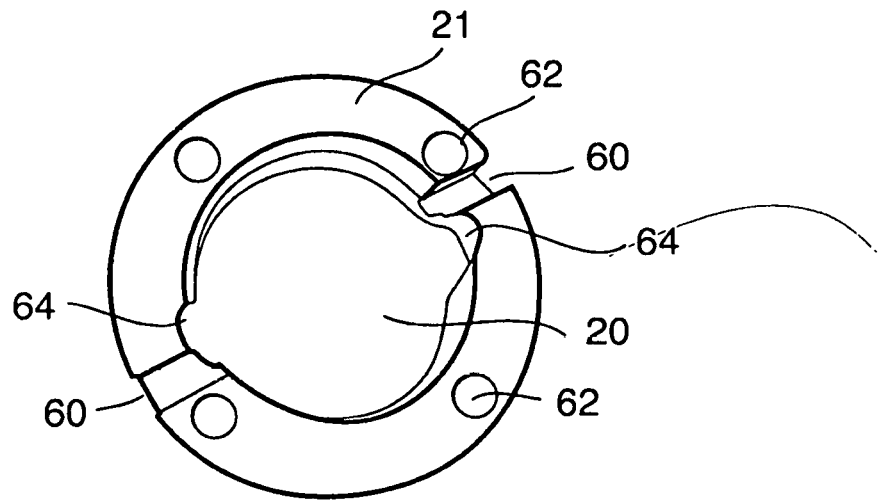
FIG. 7 is a rear view of the knife ring 21.
Figure 8:
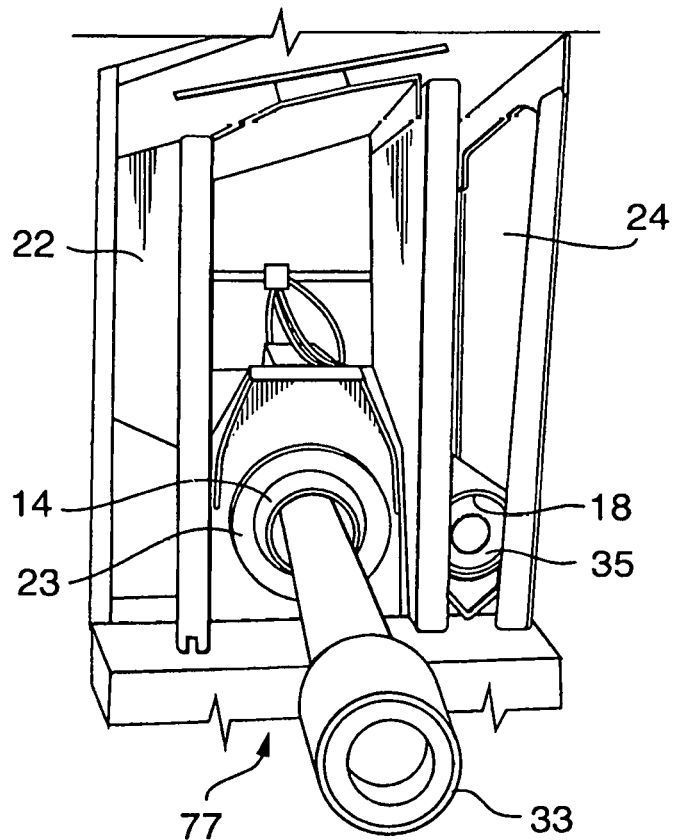
FIG. 8 is a front view of the actuator 33 extended in a cartridge ejecting position.
Figure 16:
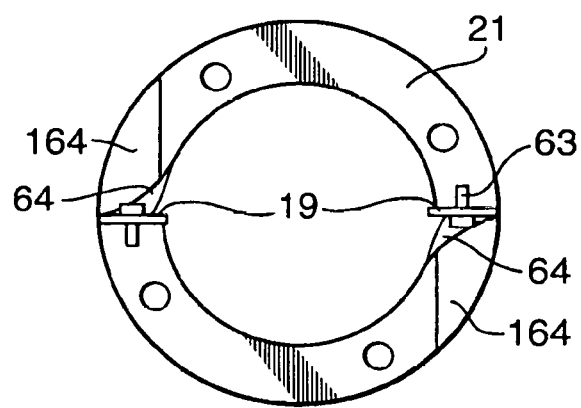
FIG. 16 is a rear view of a preferred knife ring 21 with knives 19.

Shown in FIGS. 3-5 and 10, a cylinder 23 is caused to spin within the bushing 76 by a motor driven belt 54 which is drivingly connected at the rear end of drive cylinder 23. Drive belt 54 is driven by pulley and motor combination 55. Drive cylinder 23 is hollow and has an inner diameter of about 0.100 inches greater than the outside diameter of a caulk cartridge 16. Knife ring 21 is rigidly attached to the rear end face of drive cylinder 23 by four screws 25, as shown in FIG. 5. As best shown in FIGS. 6 and 16, the knife 19 extends inward from knife ring 21 and is removably locked within the slot 60 by screw 63. Two knife slots 60 are available so that, optionally, one or two knives 19 may by used. The central opening of knife ring 21 provides a throat 20 through which a cartridge is coaxially thrust during the label removal process. The preferred knife ring 21 in FIG. 16 includes a cutaway 164, rather than a slot 60, for easier attachment and adjustment of knives 19.

As can be seen in FIGS. 3-5, cartridge hoppers 22 and 24 are mounted on either side of frame 77. FIG. 1 shows an infeed chute 26 which provides a ramp down which cartridges 16 roll to the enter hoppers 22 and 24. Cartridges at the bottom of hoppers 22 and 24 are at the same elevation as the infeed throat 20 of label removal unit 6. The label removal unit 6 is rigidly fixed to base plate 43 in a position which is adjacent to the mandrels 14 and 18 such that, when carriage plat 12 is at the extreme left position, mandrel 18 is in coaxial alignment with the cartridge at the bottom of hopper 24 and mandrel 14 is in coaxial alignment with the center of throat 20. Further, when carriage plat 12 is at the extreme right position, mandrel 18 is in coaxial alignment with the center throat 20 and mandrel 14 is in coaxial alignment with a cartridge at the bottom of hopper 22.

With belt 54 driving cylinder 23, knife ring 21 and knife 19, mandrels 14 and 18 alternately carry cartridges 16 axially through throat 20 so that knife 19 peels a thin outer layer off of cartridge 16.

A shavings suction chute 82 surrounds the knife ring 21 and extends downward to the base plate 43. A passage 84 extends through the base plate 43 to a suction hose 120 which leads to the shavings collection system for collecting shavings which are produced in the label removal process. Knife ring 21 is attached to the rear face of suction chute 82 with screws inserted into apertures 62 and includes a milled out crescent shaped opening 64 to enhance the expulsion of shavings produced by knife edge 66. Three knife edged pins 83 are mounted on the marginal edge of throat 20 of suction chute 82. The sharp edges of pins 83 point inward toward the center of throat 20 and are located equidistant from one another with the sharp edges located so that as a mandrel pushes a cartridge 16 through throat 20, the sharp edges score three lines along the length of cartridge 16. The score lines cause the shavings to break into pieces no longer than ⅓ of the circumference of cartridge 16. Longer shavings cause jams in the throat 20 and suction chute 82. The spinning knife 19 peels a thin layer from the cartridge 16 moving axially through throat 20 and the shavings are sucked down through suction chute 82 to a shavings collection container.

Figure 18:
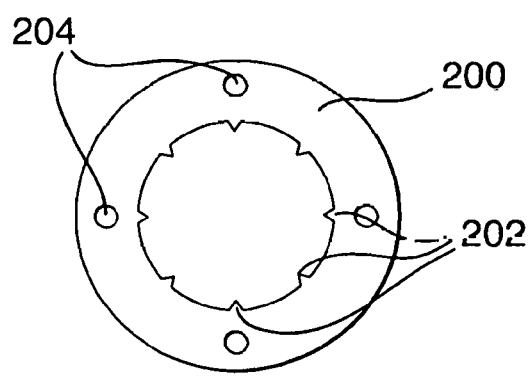
FIG. 18 is a rear view of the scoring ring 200.
Figure 19:
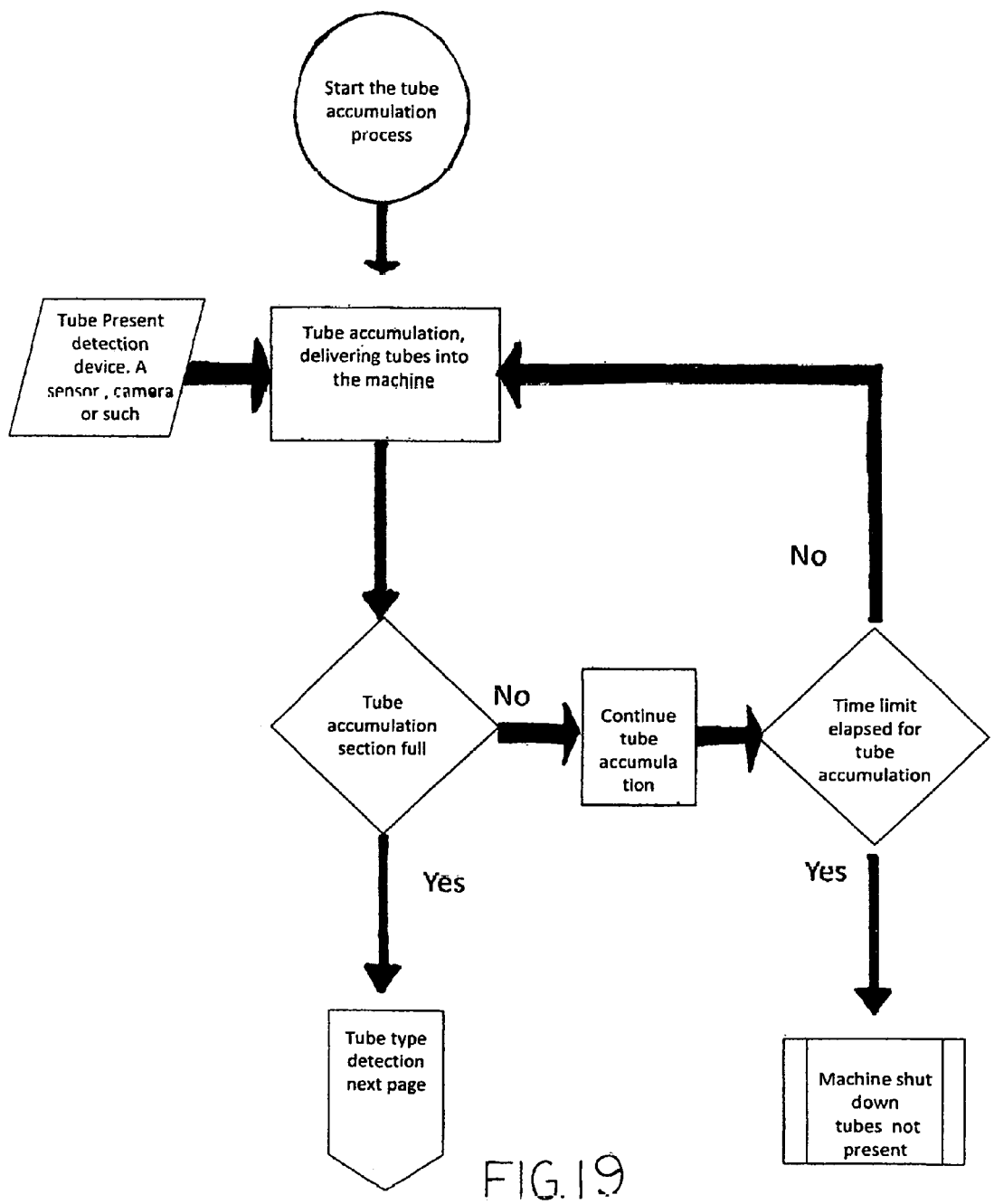
FIG. 19 is a flow chart showing tube feed and accumulation as an example of the conditions that may exist as the tubes are entering the machine and the tube present device is a component or assembly, used to determine if the tube receiving area has an adequate number of tubes.
Figure 20:
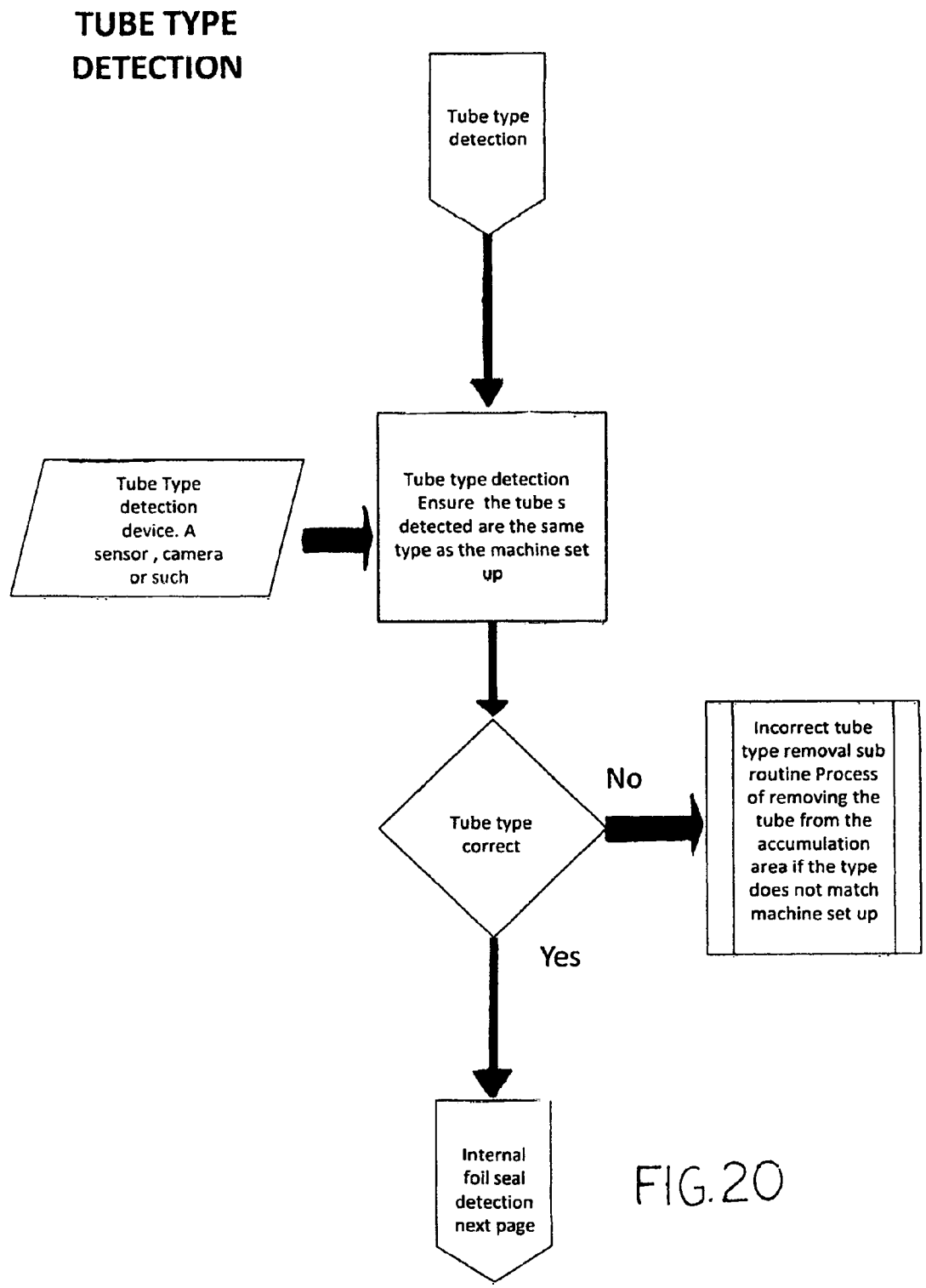
FIG. 20 is a flow chart showing tube type detection as an example of the conditions that may exist during detection of the tube type with an inspection camera or other device to ensure that the tubes being loaded match the machine set up and that there are various tube types that have the same visual appearance, but differ in wall thickness, material type and color.
Figure 21:
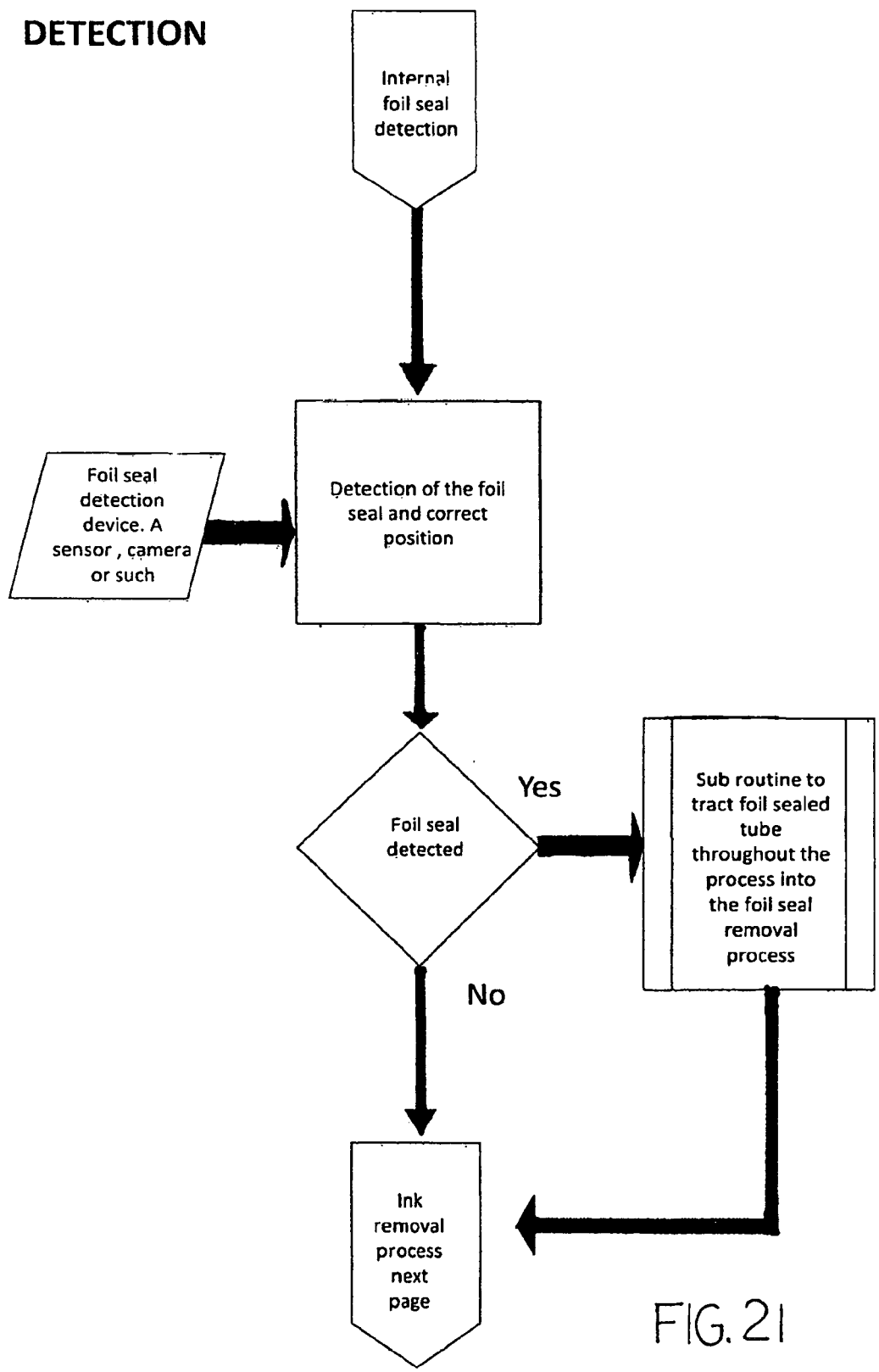
FIG. 21 is a flow chart showing foil seal detection as an example of the process conditions that may exist to detect and remove foil form a tube, where upon detecting foil, that particular tube is tracked as it moves through the process into the foil seal removal apparatus to remove the foil from the tube for tube or plastic reuse.
Figure 22:
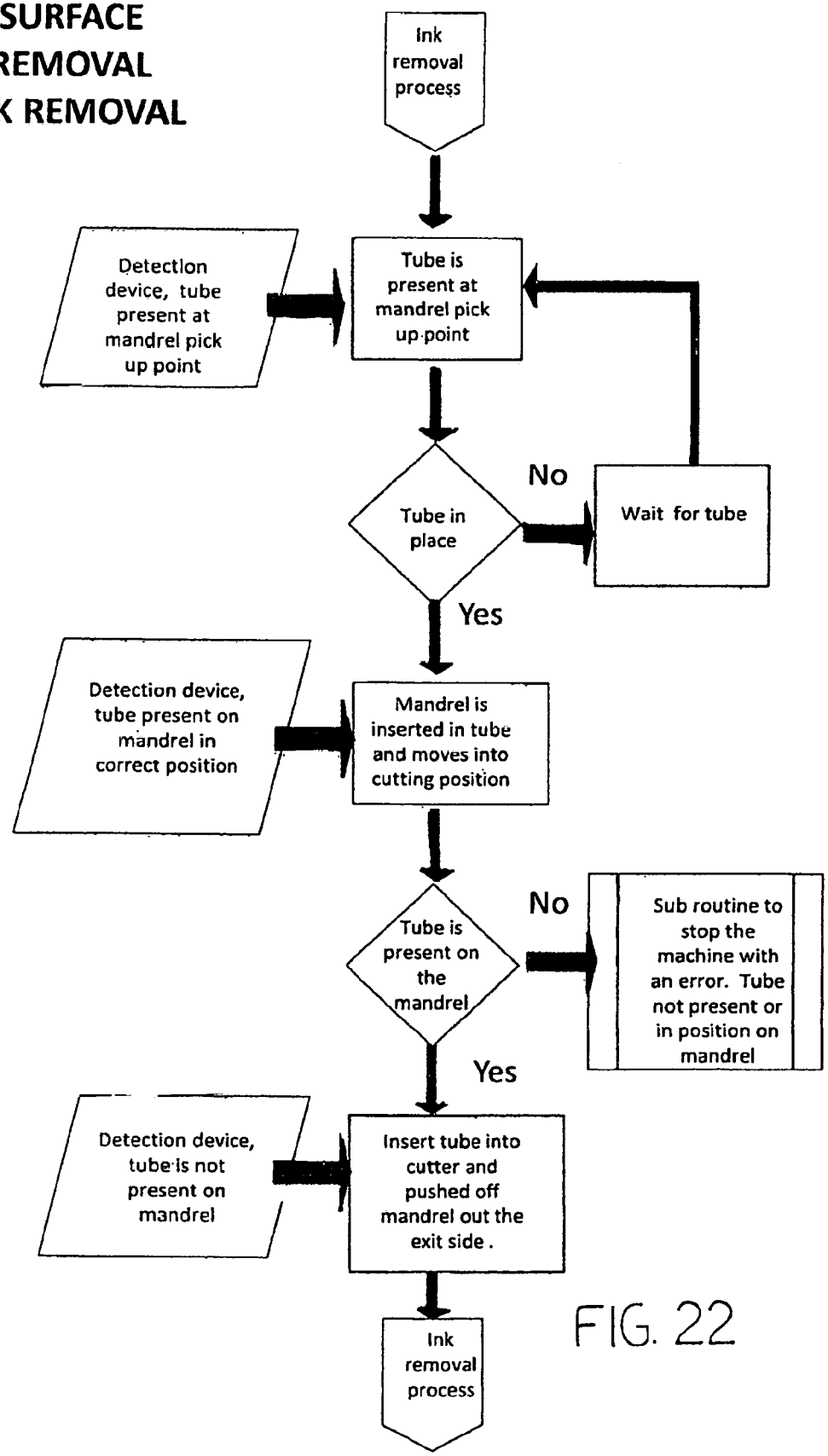
FIG. 22 is a flow chart showing surface removal ink removal as an example of the ink removal process wherein a single mandrel is used or if multiple mandrels are used, for example two mandrels, one mandrel will pick up a tube as the second mandrel removes the ink, and if ink is detected after the ink removal process, the tube can be processed again.
Figure 23:
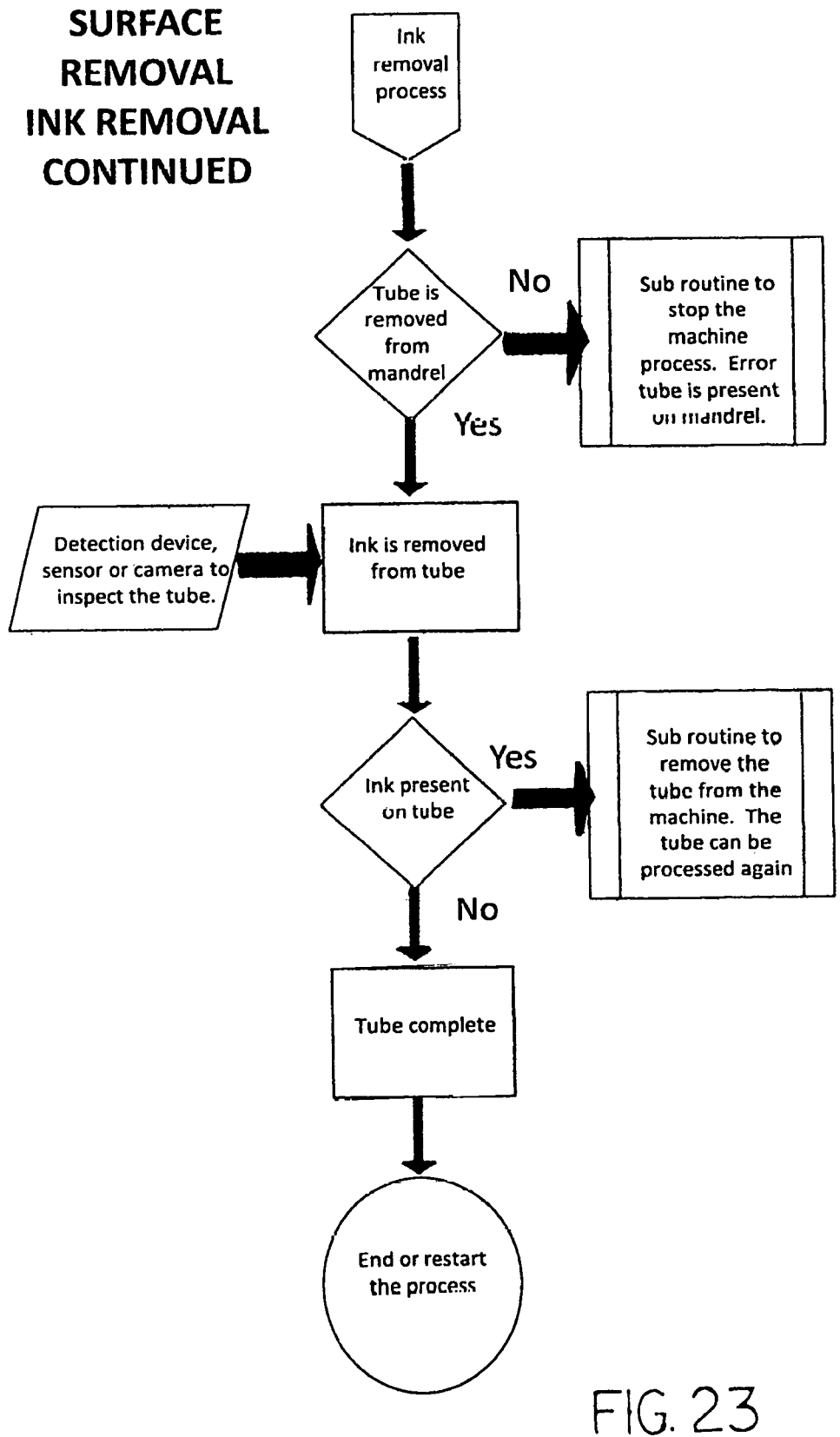
FIG. 23 is a continuation flow chart of FIG. 22 showing surface removal ink removal.

A preferred embodiment of the label remover includes a scoring ring 200 as shown in FIG. 18 which contains a plurality of inward pointing knife edges 202 which score the cartridge 16 as it passes through the label remover unit 6. This embodiment doesn't include knife edged pins 83. The scoring ring 200 is attached to the rear face of suction chute 82 with screws inserted into apertures 204. Scoring ring 200 is coaxial with horizontal cylinder 23.

Figure 15:
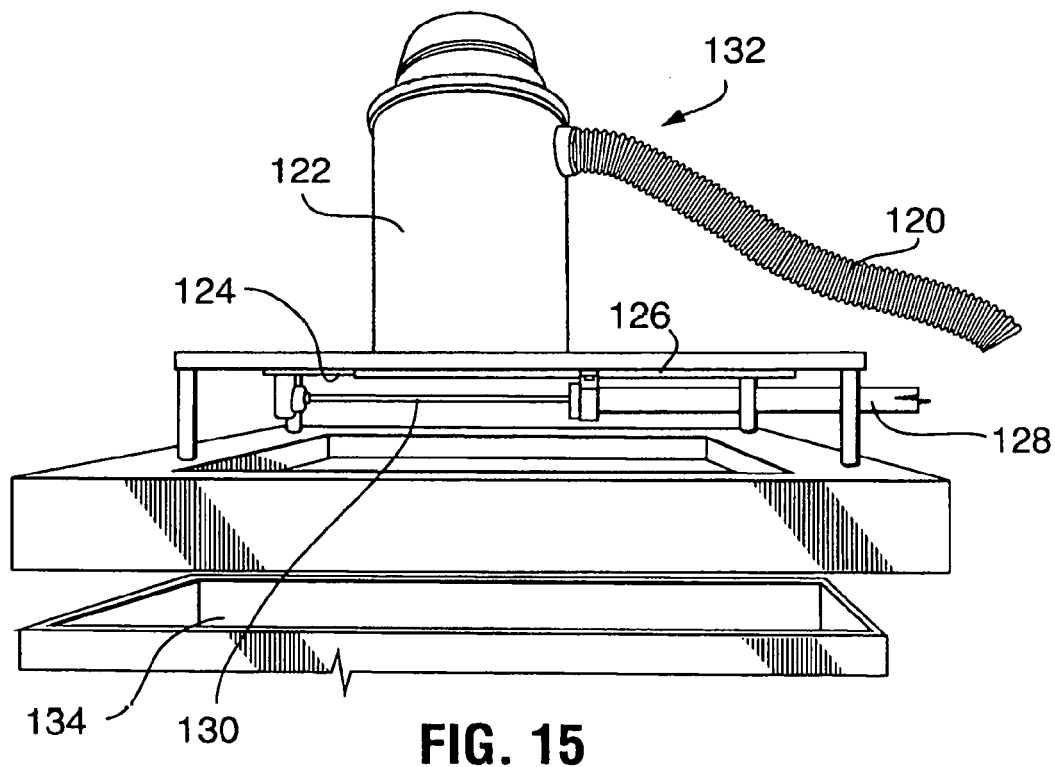
FIG. 15 is a front view of the shavings collection system 132.

FIG. 15 shows the shavings collection system 132 which includes a suction pump and cannister 122, a hose 120, a waste bin 134, and a trap door system for automatically emptying the cannister 122. Cannister 122 is an upright cylinder which is open at the bottom. Sliding door 124 slides in channel frame 126. Piston 130 is connected to sliding door 124. Pneumatic cylinder 128 extends piston 130 to close door 124 while the system is running and retracts piston 130 to open door 124 to empty the contents of cannister 122 into bin 134. Suction produced by suction pump and cannister 122 pulls door 124 up tightly to seal the opening of cannister 122 against leakage.

Figure 9:
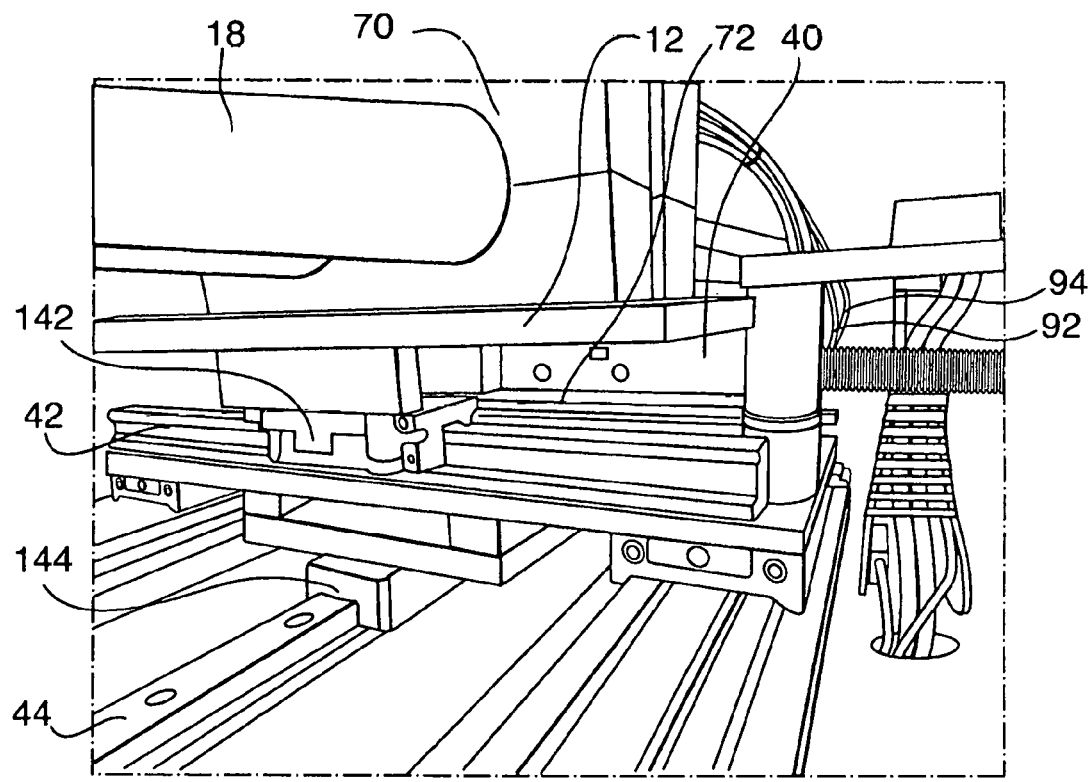
FIG. 9 is a partial left front view of the cartridge handler 8 particularly showing the linear actuator 40 and associated elements.
Figures 10, 11:
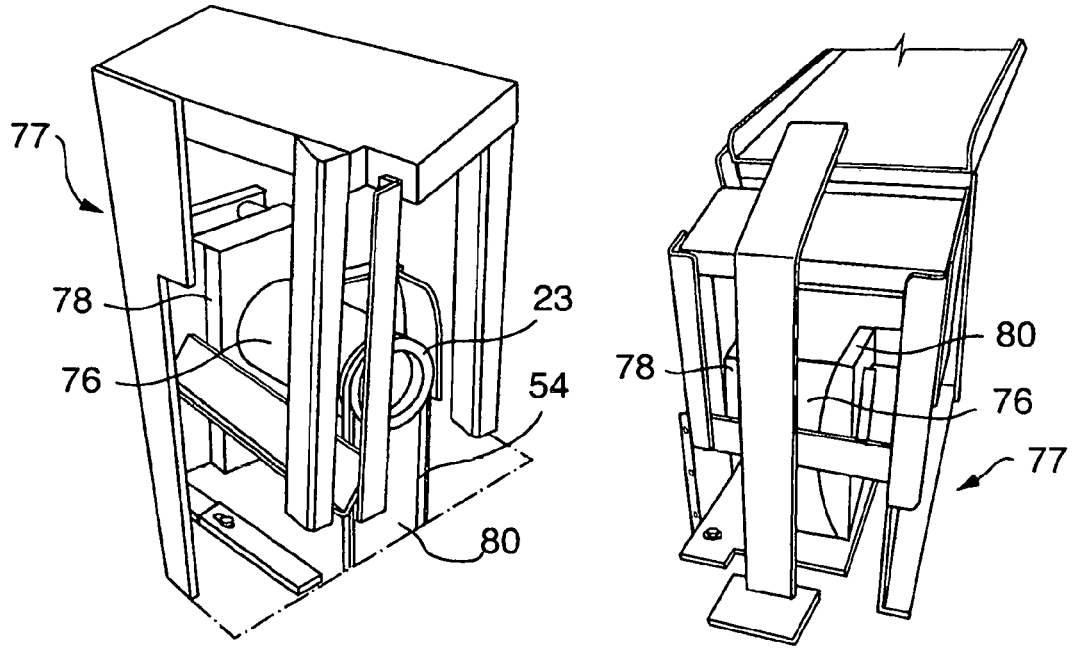
FIG. 10 is a right front view of the label removal unit 6.
FIG. 11 is a right perspective view of the label removal unit 6.
Figure 12:
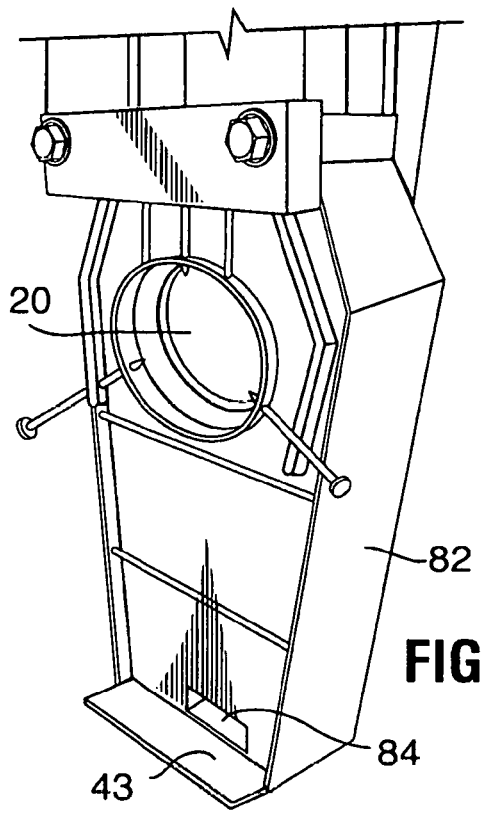
FIG. 12 is a right rear view of the shavings suction housing 80.
Figure 13:
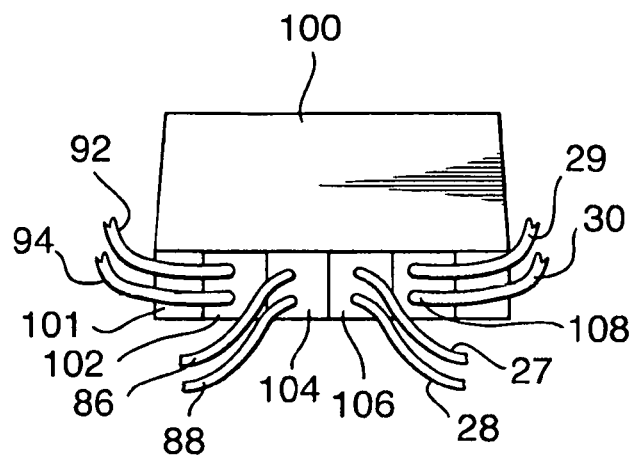
FIG. 13 is a front view of the controller 100, motor starter 101 and solenoids 102-108.
Figure 14:
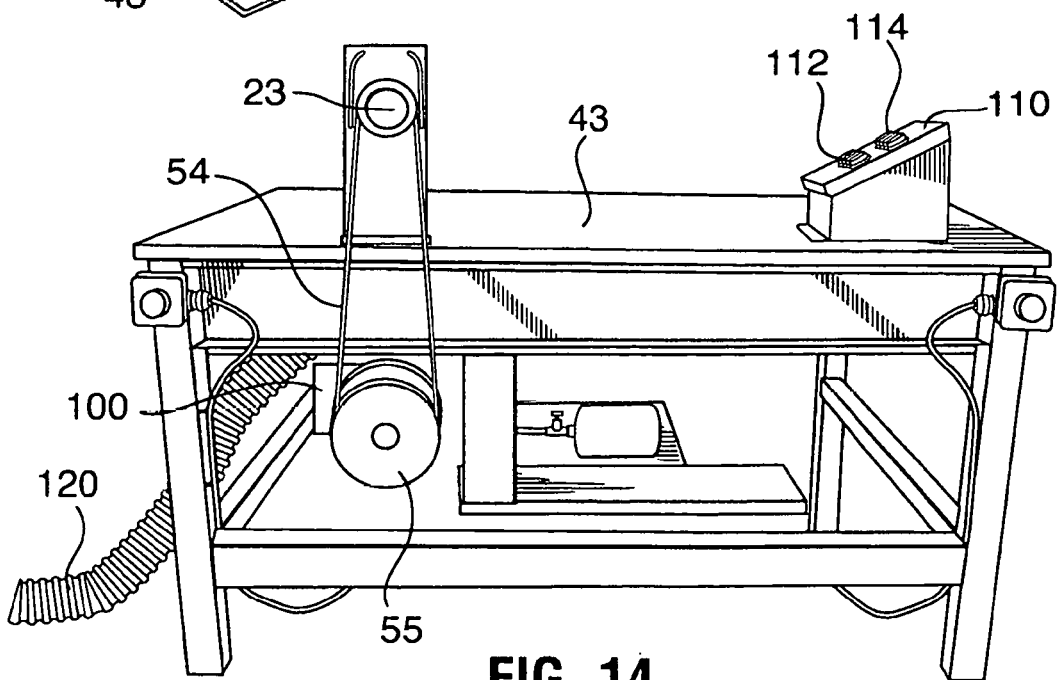
FIG. 14 shows is a front view of the cartridge label remover including the programmable controller.

A programmable controller 100, shown in FIGS. 13 and 14, controls pneumatic solenoids 102-108 which activate the linear actuators 40, 46 and 48 and eject cylinders 32 and 34. FIGS. 1 and 13 show that solenoid 106 controls pneumatic lines 27 and 28 to extend and retract eject cylinder 32. Also, solenoid 108 controls pneumatic lines 29 and 30 to extend and retract eject cylinder 34. FIGS. 9 and 13 show solenoid 102 controlling lines 92 and 94 to cause linear actuator 41 to move carriage plate 12 to the left or right. FIGS. 2 and 13 show solenoid 104 controlling pneumatic lines 86 and 88 to cause linear actuators 46 and 48 to move longitudinal carriage plate 41, along with linear actuator 40, carriage plate 12 and mandrels 14 and 18, in a forward and rearward direction. Controller 100 also controls motor starter 101 to cause belt motor 55 to drive cylinder 23 and thus to spin knife 19. Inputs to the controller include the end of stroke sensors 50, 52, 72 and 73 for the linear actuators and the start switch 114 and stop 112 switch on operator panel 110. Various time delays for linear actuators and eject cylinders are adjustable and cartridge processing speed can also be adjusted. The logic program in the programmable controller can be adjusted and changed as desired.

One embodiment of the present invention uses hydraulic cylinders instead of rodless pneumatic cylinders or standard pneumatic cylinders to provide linear motion of the mandrels 14 and 18, of the carriage plate 12 and of the eject plungers 33. Another embodiment employs servo motors with appropriate linkage and lever arms to provide linear motion of the mandrels 14 and 18, of the carriage plate 12 and of the eject plungers 33. Still another embodiment contains mechanical plungers driven by a cam instead of rodless pneumatic cylinders or standard pneumatic cylinders to provide linear motion of the mandrels 14 and 18, of the carriage plate 12 and of the eject plungers 33. A combination of hydraulic cylinders, servo motors with appropriate linkage and lever arms, and mechanical plungers driven by a cam are used to provide linear motion of the mandrels 14 and 18, of the carriage plate 12 and of the eject plungers 33 in yet another embodiment of the present invention.

Figure 17:
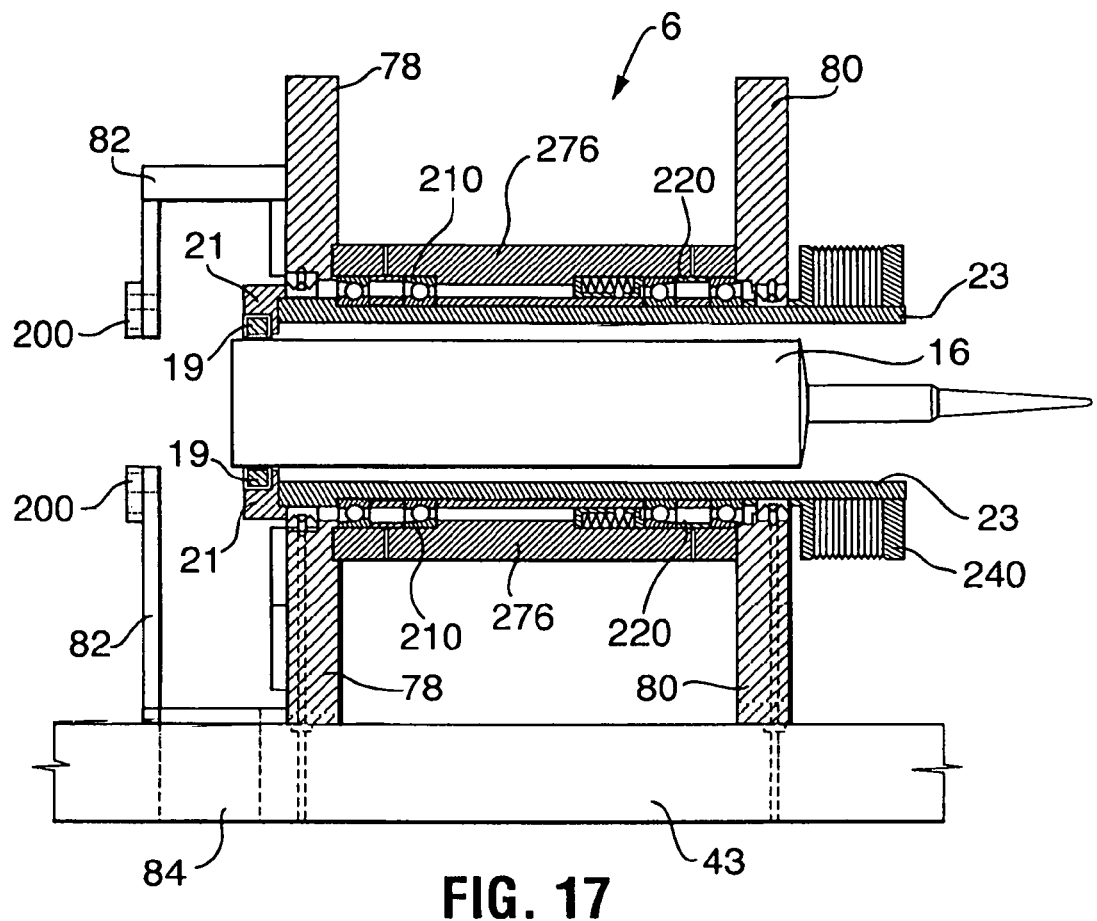
FIG. 17 is a vertical cross-sectional view of the label removal unit 6 taken along the axis of the horizontal cylinder 23.

As shown in FIG. 17, still another preferred embodiment of the present invention, includes a label remover unit 6 wherein horizontal cylinder 23 is rotatably held within roller bearings 210 and 220 which, in turn are housed within cylindrical housing 276. The two vertical end walls 78 and 80 are attached to base plate 43 and rigidly support housing 276. Two seals 212 and 222 prevent the leakage of bearing lubricant from each end of housing 276. Further, horizontal cylinder 23 includes an integral pulley member 240, at the front end, to be driven by belt 54. Knives 19 are adjustably attached to knife ring 21.

The sequence of operation of the cartridge label remover 10 is as follows:

Initial conditions: The carriage 12 is in the full reverse and left location ready to move mandrels 14 and 18 forward:

a. Load cartridges onto cartridge chute 26 and into hoppers 22 and 24.
b. Press the Start switch 114. This causes pulley and motor combination 55 to run which causes the knife ring 21 to spin.
c. Solenoid 104 energizes to cause linear actuators 46 and 48 to move carriage 12 and thus mandrels 14 and 18, forward:
   Mandrel 18 enters the cartridge at the bottom of hopper 24.
   Mandrel 14 moves axially though throat 20.
d. Solenoid 104 de-energizes to cause linear actuator 46 and 48 to move carriage 12, mandrel 14, mandrel 18 and the cartridge at the bottom of hopper 24 to the extreme rear position. (Mandrel 18 forms a friction fit with and thus holds the cartridge.)
e. Solenoid 102 energizes to cause linear actuator 40 to move carriage 12 to the extreme right position. (Now, mandrel 18 is axially aligned with throat 20 and mandrel 14 is axially aligned with the cartridge at the bottom of hopper 22.)
f. Solenoid 104 energizes to cause linear actuators 46 and 48 to move carriage 12 forward. As mandrel 18 moves forward, the cartridge on mandrel 18 is moving through the thread knife edges 83 and spinning knife ring 21. Knife 19 shaves off and removes the outer skin with the label from the cartridge. The shavings are sucked down through the shavings chute 82 and through passage 84 to the shavings collection system. At the end of the forward stroke, eject solenoid 108 energizes to extend cylinder 34 which pushes the de-labeled cartridge off of mandrel 18 to eject the cartridge into a bin. Simultaneously, mandrel 14 has entered the cartridge at the bottom of hopper 22. After a time delay, solenoid 108 de-energizes to retract the eject piston and plunger.
g. Solenoid 104 de-energizes to cause linear actuators 46 and 48 to move carriage 12 to the extreme rear position. Mandrel 18 is now empty and mandrel 14 has the cartridge which was picked up at the bottom of hopper 22.
h. Solenoid 102 de-energizes, causing carriage 12 to move to the extreme left hand position.
i. Solenoid 104 energizes to cause linear actuators 46 and 48 to move carriage 12 forward. As mandrel 14 moves forward, the cartridge on mandrel 14 is moving through knife edges 83 and spinning knife ring 21. Knife 19 shaves off and removes the outer skin with the label from the cartridge. The shavings are sucked down through the shavings chute 82 and through passage 84 to the shavings collection system. At the end of the forward stroke, eject solenoid 106 energizes to extend cylinder 32 which pushes the de-labeled cartridge off of mandrel 14 to eject the cartridge into a bin. Simultaneously, mandrel 18 has entered the cartridge at the bottom of hopper 24. After a time delay, solenoid 108 de-energizes to retract the eject piston and plunger.
j. Return to step 4.

Pushing the Stop button at any time during the process causes the carriage 12 to return to the extreme rear position and stop after processing the cartridge which is in process. Pushing an Emergency Stop button causes the process to stop immediately and removes all air from all pneumatic actuators.

In another embodiment of the present invention, an additional sensor such as a camera would inspect all incoming cartridges to ensure that a cartridge of the wrong type or color is kicked out rather than passing through the process.

Further, a quality control sensor such as a second camera inspects the finished cartridge to ensure that the entire label has been removed. If part of the label remains, that cartridge is automatically reprocessed.

It is anticipated that another embodiment of the present invention has multiple label removal units 6, each with two hoppers, and multiple cartridge handling units 8, and multiple cartridge handling units all connected in tandem to increase throughput.

It is further anticipated that still another embodiment contains one label removal unit with only one hopper and that the cartridge handling unit 8 has only one mandrel. While this embodiment processes, at most, one half of the cartridges which can be processed by a unit with two hoppers and two mandrels in the same amount of time, this label remover is less complicated, has fewer moving parts and is less expensive. A flowchart follows, on the next five pages, for such a unit which also includes more quality detection sensors such as cameras and a device which checks for the undesirable presence of a foil seal which is normally adhered into place inside the cartridge at the closed end before filling the cartridge with caulk or adhesive. In the event that a cartridge includes such a piece of foil, that cartridge will be removed from the process.

Thus a preferred embodiment of the cartridge and tubular container refinishing apparatus, comprises a base plate and a label removing unit rigidly attached to the base plate. The label removing unit includes a frame having two vertical end walls with a bushing type bearing rigidly attached horizontally therebetween. The bushing has a cylinder rotatably held therewithin. The cylinder is open at both ends and is caused to spin by a motor driven belt drivingly engaged at a front end thereof. The cylinder has a knife-holding ring rigidly connected to a rear end face. The cylinder and the knife ring are configured to allow the cartridge to pass axially therethrough. The ring has at least one slot allowing at least one knife to be adjustably held therein. The ring has at least one threaded aperture formed therein and at least one screw threaded into the at least one threaded aperture for engaging and rigidly securing the knife. The knife has a label shaving edge extending inward toward an axial center of the knife-holding ring. The frame has a first cartridge hopper on one side adjacent to the horizontal cylinder and a second cartridge hopper on an opposite side. The cartridge hoppers are configured so that a first axis of a cartridge at the bottom of the first hopper is parallel to a second axis of a cartridge at the bottom of the second hopper. A third axis of the horizontal cylinder is level with, parallel to and centered between the first axis and the second axis. The label removing unit including a cartridge infeed chute rollingly feeding cartridges to the first hopper and the second hopper. The frame includes a shavings suction chute comprising a housing extending rearward from a rear face of the frame. The housing has an aperture formed therein which is coaxial with and slightly larger than the open end of the knife ring. The housing extends downward to a passage leading to a suction system and then to a shavings collection system. A cartridge handling unit is rigidly attached to the base plate. The cartridge handling unit includes two longitudinal linear actuators rigidly affixed to the base plate. The two longitudinal linear actuators are capable of carrying a longitudinal carriage plate forward towards the label removal unit or rearwards away from the label removal unit. The longitudinal carriage plate has a lateral linear actuator rigidly affixed to a top surface thereof. The lateral linear actuator carries a lateral carriage plate to an extreme left or an extreme right position. The lateral carriage plate has a mandrel support block rigidly mounted on a top surface thereof. The block rigidly and removably holds two cartridge grasping mandrels. The mandrels extend forward from a front face of the block. The mandrels are cylindrical, open ended at each end, and capable of sliding axially inside and forming a friction fit with the cartridges. A first mandrel has a fourth axis. A second mandrel has a fifth axis. The fourth and the fifth axes are parallel and level with one another and are spaced apart by the same distance as are the first axis and the third axis. The free open ends of the first and the second mandrels are spaced at a same distance from a center of the mandrel support block. The lateral carriage plate has two cartridge eject cylinders mounted thereon at a position rearward of the mandrel holding block. A first eject cylinder is coaxial with the first mandrel. A second eject cylinder is coaxial with the second mandrel. The piston rods of the eject cylinders each have a cartridge pushing plunger attached at the free end thereof. A first of the piston rods extends through the first mandrel. A second of the piston rods extend through the second mandrel. The free end of the plungers are flush with the free open ends of the mandrels. The cartridge handling unit is positioned on the base plate so that when the lateral carriage plate is at an extreme left position, the fourth axis of the first mandrel is coaxial with the first axis of the cartridge at the bottom of the first hopper and the fifth axis of the second mandrel is coaxial with the third axis of the horizontal cylinder. The cartridge handling unit is positioned on the base plate so that when the lateral carriage plate is in an extreme right position, the fourth axis of the first mandrel is coaxial with the third axis of the horizontal cylinder and the fifth axis of the second mandrel is coaxial with the second axis of the cartridge at the bottom of the second hopper. The cartridge handling unit is positioned so that when the longitudinal carriage plate is in an extreme rearward position, the free open ends of the mandrels are located rearward enough from a rear face of the knife ring so that a cartridge is held one of the mandrels moves freely past the knife ring as the lateral carriage plate moves left to right. A belt motor starter controlling the motor driving the belt to spin the horizontal cylinder. A first pneumatic solenoid controlling the longitudinal linear actuator. A second pneumatic solenoid controlling the lateral linear actuator. A third pneumatic solenoid controlling the first eject cylinder. A fourth pneumatic solenoid controlling second eject cylinder. A fully forward sensor providing positional feedback for the longitudinal linear actuators. A fully rearward sensor providing positional feedback for the longitudinal linear actuators. A fully left sensor providing positional feedback for the lateral linear actuator. A fully right sensor providing positional feedback for the lateral linear actuator. An operator's panel including a start switch and a stop switch. A programmable controller controls the first, the second, the third and the fourth pneumatic solenoids and the belt motor starter. The programmable controller receives input signals from the fully forward sensor, the fully rearward sensor, the fully left sensor, the fully right sensor, the start switch and the stop switch. The programmable controller contains a program with adjustable time delays and re-programmable logic for reacting to sensor signals and switches and energizing and de-energizing outputs controlling the solenoids and the motor starter.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A label removing unit, comprising:
a frame comprising two vertical end walls with a bushing or a bearing rigidly attached horizontally therebetween;
said bushing or said bearing having a cylinder rotatably held therewithin, said cylinder being open at both ends;
means for rotating said cylinder comprising a motor driven belt, chain or gear assembly cooperatively engaged said cylinder;
said cylinder including a knife holding ring rigidly connected to a rear end face thereof;
said cylinder and said knife holding ring are configured to allow said cartridge to pass axially therethrough;
said knife holding ring having at least one slot allowing at least one knife and means for adjustably holding said at least one knife therein; and
said knife holding ring having a label shaving edge extending inward toward an axial center.

2. The label removing unit of claim 1, wherein said means for holding said at least one knife in said knife holding ring includes at least one threaded aperture formed therein and at least one screw threaded into said at least one threaded aperture for engaging and rigidly securing said knife.

3. The label removing unit of claim 1, further comprising at least one cartridge hopper in flow communication with said cylinder.

4. The label removing unit of claim 1, including a shavings suction chute extending to a suction system connecting to a shavings collection system.

5. The label removing unit of claim 1 further including at least two knife edges attached to an inside edge of said aperture of said knife holding ring, said at least two knife edges pointing radially inward toward a center of said aperture, said knife edges configured to score an outer thickness of said cartridge as a mandrel carries a cartridge through said aperture.

6. The label removal unit of claim 1 further containing a knife holding ring including at least two knife edges pointing radially inward, said at least two knife edges pointing radially inward toward a center of an axis of said horizontal cylinder, said knife edges configured to score an outer thickness of said cartridge as a mandrel carries said cartridge through said aperture.

7. The cartridge and tubular container shaving apparatus of claim 1, said label shaving edge removing from 0.001 to 10.0 millimeters of material from an exterior surface of said cartridge.

8. A cartridge handling unit, comprising:
a base plate;
said cartridge handling unit including at least one longitudinal linear actuator affixed to said base plate, said at least one longitudinal linear actuator capable of carrying a longitudinal carriage plate forward towards a label removal unit or rearwards away from a label removal unit;
said longitudinal carriage plate having at least one lateral linear actuator rigidly fixed to a top surface thereof for carrying a lateral carriage plate to a selected right or left position;
said lateral carriage plate having a mandrel support block mounted thereon for removably holding at least one cartridge grasping mandrel extending forward from said block;
at least one mandrel comprising an open ended cylinder, said at least one mandrel capable of sliding axially inside and forming a friction fit with said cartridge;
said lateral carriage plate having at least one cartridge ejection cylinder mounted thereon at a position rearward of said mandrel;
at least one ejection cylinder positioned coaxial with said at least one mandrel having a cartridge pushing plunger attached at the free end thereof; and
said mandrel of said cartridge handling unit positionable for holding and moving said cartridge freely past a knife holding ring as said lateral carriage plate moves in a selected lateral position.

9. The cartridge handling unit of claim 8 including a forward sensor providing positional feedback for said at least one longitudinal linear actuator, a rearward sensor providing positional feedback for said at least one longitudinal linear actuator, a left sensor providing positional feedback for said at least one lateral linear actuator; and a right sensor providing positional feedback for said at least one lateral linear actuator.

10. The cartridge handling unit of claim 8 further comprising a programmable controller controlling a plurality of pneumatic solenoids, said programmable controller receiving input signals from said forward sensor, said rearward sensor, said left sensor, said right sensor, and said programmable controller containing a program with adjustable time delays and re-programmable logic for reacting to sensor signals and switches and energizing and de-energizing outputs controlling said solenoids and said motor.

11. The cartridge handling unit of claim 8 wherein said longitudinal linear actuators and said lateral linear actuator comprise rodless pneumatic cylinders.

12. The cartridge handling unit of claim 8, said mandrel comprising a hollow cylinder slightly tapered with a smaller diameter at a free open end with an outer diameter increasing slightly along its length for providing a friction fit with an inner surface of said cartridge.

13. The cartridge handling unit of claim 8 wherein a linear motion of said mandrel results from a mechanical plunger selected from the group consisting of a mechanical plunger driven by a cam, a rodless pneumatic cylinder, a standard pneumatic cylinder, a hydraulic cylinder, a servo motor with linkage and lever arms, and combinations thereof.

14. A label removing unit, comprising a frame including a bushing having a cylinder open at both ends rotatably held therein, means for rotating said cylinder, said cylinder including a knife holding ring connecting to a rear end face thereof, said cylinder and said knife holding ring configured to allow said cartridge to pass axially therethrough, said knife holding ring having at least one opening allowing at least one knife to be adjustably held therein in a selected position having a label shaving edge extending inward toward an axial center of said knife holding ring.

15. The label removing unit of claim 14 including a shaving collection system in flow communication with said label removal unit.

16. A cartridge handling unit in conjunction with a knife holding ring, the cartridge handling unit comprising at least one linear actuator capable of carrying a carriage plate forward towards a label removal unit or rearwards away from said label removal unit, said carriage plate including means for removably holding at least one cartridge grasping mandrel extending forward therefrom, said mandrel sliding axially engaging an inner surface of a cartridge, said carriage plate including means for ejecting at least one cartridge therefrom mounted in a coaxial relationship with said mandrel, and said cartridge movably held by said mandrel through said knife holding ring.

17. The cartridge handling unit of claim 16, including at least one cartridge hopper in cooperative engagement with a cartridge infeed chute feeding a cartridge to said at least one cartridge grasping mandrel.

18. The cartridge handling unit of claim 16, said mandrel-comprising a hollow cylinder slightly tapered with a smaller diameter at a free open end with an outer diameter increasing slightly along its length for providing a friction fit with an inner surface of said cartridge.

19. The cartridge handling unit of claim 16 wherein a linear motion of said mandrel results from a mechanical plunger selected from the group consisting of a mechanical plunger driven by a cam, a rodless pneumatic cylinder, a standard pneumatic cylinder, a hydraulic cylinder, a servo motor with linkage and lever arms, and combinations thereof.

20. The cartridge and tubular container shaving apparatus of claim 16, said label shaving edge removing from 0.001 to 10.0 millimeters of material from an exterior surface of said cartridge.

\* \* \* \* \*